Dec. 30, 1958  L. R. WOODS  2,866,345
STEP MOTOR
Filed Dec. 27, 1955  5 Sheets-Sheet 1

INVENTOR.
LEROY R. WOODS
BY William R Lane
ATTORNEY

Dec. 30, 1958 L. R. WOODS 2,866,345
STEP MOTOR

Filed Dec. 27, 1955 5 Sheets-Sheet 2

INVENTOR.
LEROY R. WOODS
BY William R. Lane
ATTORNEY

Dec. 30, 1958 L. R. WOODS 2,866,345
STEP MOTOR
Filed Dec. 27, 1955 5 Sheets-Sheet 3

INVENTOR.
LEROY R. WOODS
BY
William R. Lane
ATTORNEY

Dec. 30, 1958 L. R. WOODS 2,866,345
STEP MOTOR

Filed Dec. 27, 1955 5 Sheets-Sheet 4

*INVENTOR.*
LEROY R. WOODS

BY *William R. Lane*

ATTORNEY

Dec. 30, 1958  L. R. WOODS  2,866,345
STEP MOTOR

Filed Dec. 27, 1955  5 Sheets-Sheet 5

INVENTOR.
LEROY R. WOODS
BY *William R. Lane*

ATTORNEY

United States Patent Office 2,866,345
Patented Dec. 30, 1958

2,866,345

STEP MOTOR

Leroy R. Woods, Whittier, Calif., assignor to North American Aviation, Inc.

Application December 27, 1955, Serial No. 555,613

13 Claims. (Cl. 74—111)

This invention is a new and improved step motor operated by electrical signals.

It is desirable in many situations to handle information in digital form, that is, the various signals are represented by discrete, readily-distinguishable electrical signals such as pulses. A motor may be provided which, in response to received pulses, provides a fraction of a rotation and, at the end of the pulse, reverts to its original position. By the use of ratchet means, a continuing output in steps, according to the number of impulses received, may be attained.

One of the problems involved in such a motor is obtaining output drive in opposite directions. The device of this invention provides two step motors and a differential gear which cooperate to provide output rotation in one direction or another in accordance with input electrical signals. Substantially then, as a whole, the device is a reversible step motor.

If the ordinary step motor happens to be operating into a torque which is greater than that developed by the step motor, immediately upon actuation of the ratchet means, either nothing will happen or a runaway slip under the load torque will occur, depending on the particular design of the step motor and the ratchet means. In the device of the invention, if the load is exerting a torque in the same direction and greater than the step motor torque, slip will occur only during the interval of the input impulse and for only the angle each input impulse would cause. Therefore, the motor is accomplishing its purpose in accordance with the input impulse but is deriving the power from the load torque. In this manner, a controlled slippage is allowed. In other words, the output shaft of the step motor is in a locked condition when the motor is not actuated by electrical impulses. This, in part, aids in the controlled release of torque and allows the machine to lock against and slowly release by controlled steps a much greater torque than the motor may be able to develop.

Another feature of this device is that it is relatively insensitive to variations in pulse width.

It is, therefore, an object of this invention to provide an improved step motor.

Another object of this invention is to provide a step motor having a reversible output.

It is another object of this invention to provide a step motor capable of operating into a load of varying direction and torque.

Another object of this invention is to provide a step motor having its output shaft locked when said step motor is not actuated.

Still another object of this invention is to provide a step motor which provides a controlled release of torque.

A still further object of this invention is to provide a ratchet means which is locked in position until actuated.

Other objects of invention will become apparent from the following description taken in connection with the accompanying drawings, in which Fig. 1 is a partial cross section of the device of the invention;

Fig. 3 is a view of the ratchet gear in partial section taken on line 3—3, Fig. 1;

Fig. 4 is a cross section of the ratchet gear taken on line 4—4, in Fig. 3;

Figure 1:
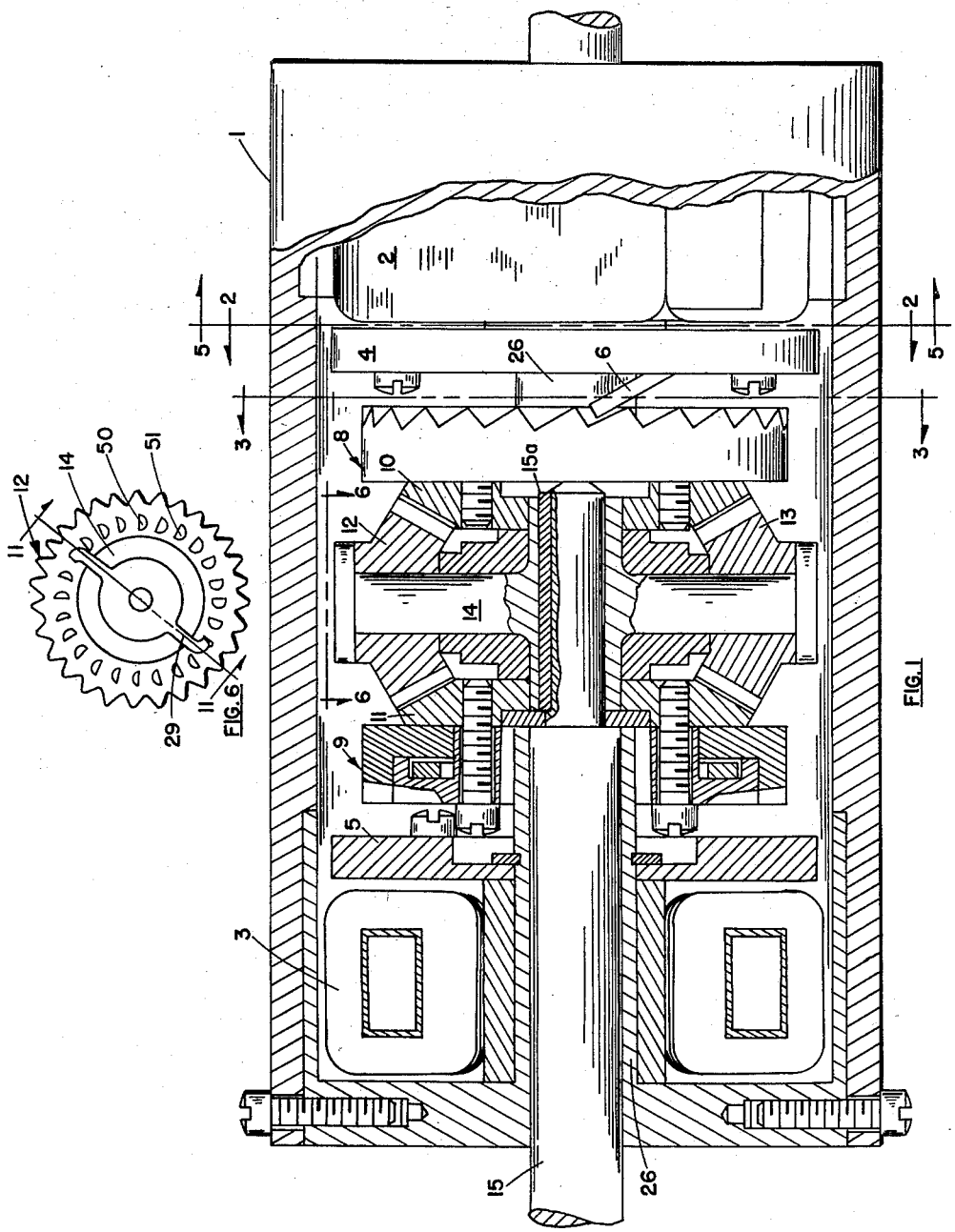

Referring now to Fig. 1, a circular housing 1 contains two prime movers whose solenoids 2 and 3 of similar construction are readily visible. Solenoid 3 is shown in section. As solenoids 2 and 3 are energized by electrical energy, armature plates 4 and 5, respectively, are caused to rotate a few degrees. Pawl means 6 and 7 (not shown) act to drive ratchet wheels 8 and 9, respectively. Ratchet wheel 9 is shown in section. Connected to be driven by ratchet wheels 8 and 9 are bevel gears 10 and 11 shown in section forming the input gears to a differential. Bevel gears 12 and 13, together with spider 14, complete the differential and act to drive output shaft 15, through suitable conventional key means 15a disposed cooperatively between the spider 14 and the shaft 15 in accordance with electrical impulses received by solenoids 2 and 3, and in a direction depending on which solenoid receives electrical pulses.

Figure 5:
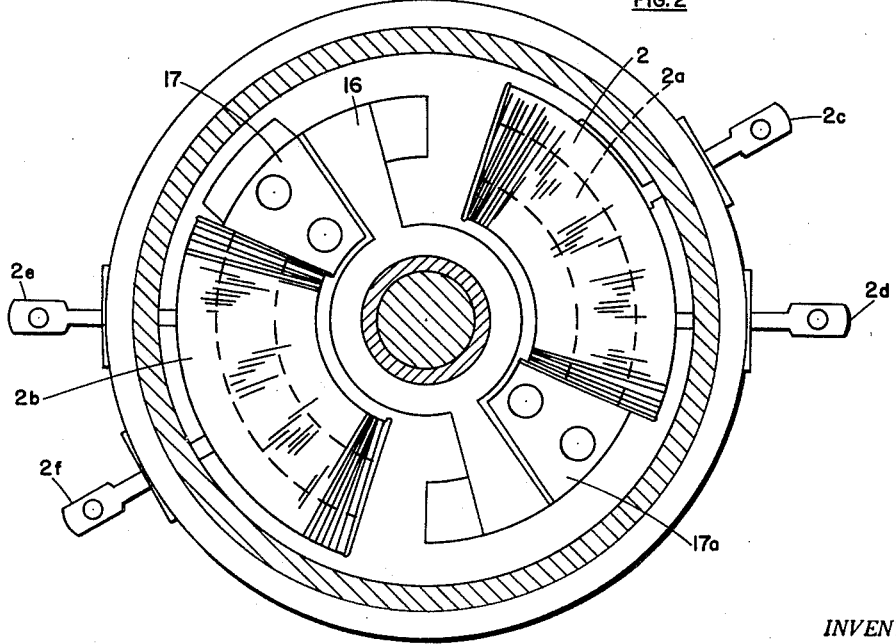
Fig. 5 is a drawing, partially in section, of one of the prime movers of the step motors of the invention.

Fig. 5 is a view of one step motor taken on line 5—5, Fig. 1. Solenoid 2 has a central soft iron core 2a to which is attracted oscillatable armature 16 upon electrical impulses being received by solenoid 2. Solenoid 2b reinforces solenoid 2 by attracting the opposite side of armature 16. Stops 17 and 17a limit the backward motion of armature 16. Terminals 2c, 2d, 2e and 2f provide electrical connections to solenoids 2 and 2b.

Figure 2:
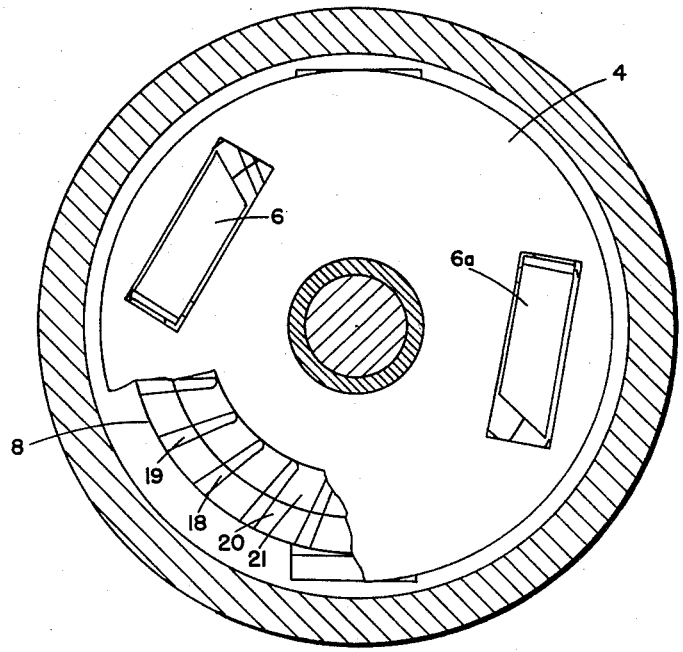
Fig. 2 is a view of the backside of the armature plate taken on line 2—2, Fig. 1.

Fig. 2 illustrates more clearly armature plate 4, together with two pawls 6 and 6a located therein. The view of Fig. 2 is taken on line 2—2 of Fig. 1, and underneath the armature plate may be seen teeth such as 18 and 19 of ratchet wheel 8. Plate 4 is attached to and driven by armature 16 of Fig. 5.

From Fig. 3 taken on line 3—3 of Fig. 1, it may be noted that ratchet gear 8 is comprised actually of two ratchet gears, an outer ratchet gear 20 and an inner ratchet gear 21 which are in close fitted relationship, but with allowable movement with respect to each other. A split spring member 22 acts to rotate the inner ratchet with respect to the outer ratchet so as to maintain their teeth out of alignment when the motor is unenergized.

Split spring member 22 is connected at one end by pin 23 to outer ratchet 20 and by stop 24 to inner ratchet 21 at its other end 24a. In this manner, ratchet wheels 20 and 21 are held normally so that their teeth are misaligned rather than in alignment as shown in Fig. 2. Of course, as the pawls (previously described) come into engagement with ratchet wheel, the teeth of the inner ratchet wheel 21 are first engaged and driven forward until in alignment with the teeth of outer ratchet wheel 20. A coil spring 25, forming a favored rotation brake, is anchored at one end in slot 27 in inner ratchet 21, extends around sleeve 26 which is firmly fixed to case 1 and encircles output shaft 15. After encircling sleeve 26 a number of times, spring 25 terminates with its lower end fixed in outer ratchet 20. It is a favored rotation brake by reason of the fact that rotation in one direction sets the brake and rotation in the other releases it.

Fig. 4 taken on line 4—4, Fig. 3, shows more clearly slot 27 in inner ratchet wheel 21 which receives one end of the spring 25 and slot 28 in outer ratchet wheel 20 which holds the other end of the spring. Spring 25 extends around sleeve 26 in such a direction as to become tightened when spring 22 forces the teeth of outer ratchet wheel 20 and the teeth of inner ratchet wheel 21 out of alignment. During such periods, then, the ratchet wheel 8 is locked by spring 25 against nonrotatable member or sleeve 26. Each of ratchet wheels 8 and 9 have such structure. Immediately upon a pawl engaging inner ratchet wheel 21, driving it forward to alignment with wheel 20, spring 25 is loosened to allow rotation of the ratchet wheels with respect to sleeve 26.

From this structure, it can be seen that, until each ratchet wheel is actuated by a pawl to cause the teeth of inner ratchet wheel 21 and the teeth of outer ratchet wheel 20 to become aligned, the ratchet wheel 8 is firmly locked against a nonrotatable member attached to the case of the device. Similar structure exists within ratchet wheel 9. Upon actuation of a pawl which moves the teeth of inner ratchet wheel 21 into alignment with the teeth of outer ratchet wheel 20, the spring is released and the ratchet wheels are no longer locked. It may be noted, at this point, that ratchet wheel 8 may turn forward as, for example, being actuated by the pawl, or may turn backward as, for example, caused by the back torque of the load, as long as the pawl maintains the teeth of the inner and outer ratchet wheels in alignment. This is the manner in which the device operates to control the release of torque. Until impulses are received, the device is spring-locked by spring 25 against torque received from the load. Other locking devices may be used. Generally, the principle is to be the same, that is, until two members are driven into alignment, the ratchet wheel is locked against rotation.

Figure 7:
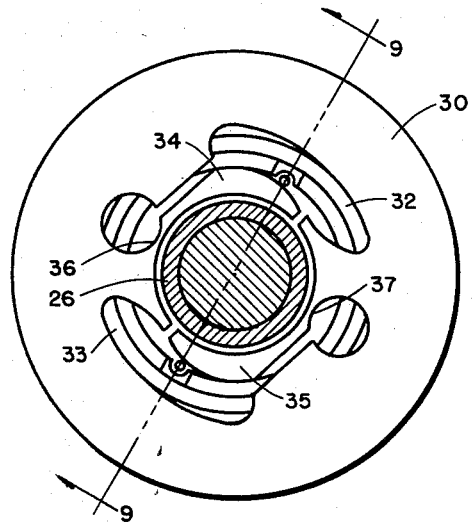
Figs. 7 and 8 illustrate an alternate braking mechanism.
Figure 8:
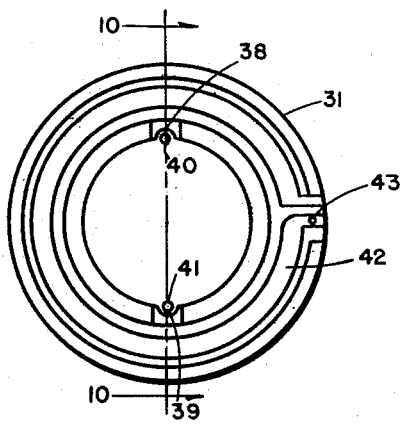
Figure 9:
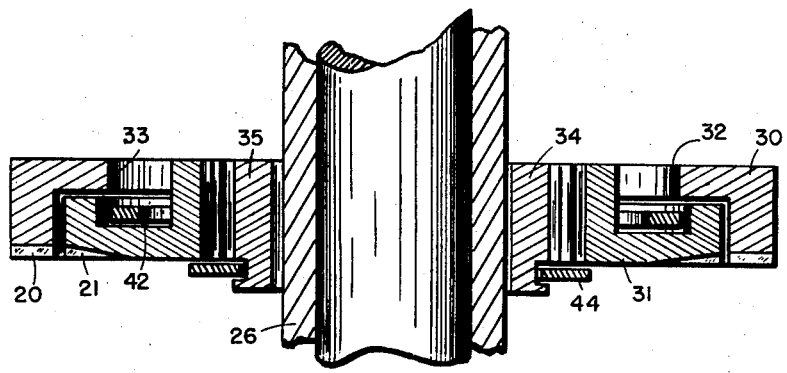
Fig. 9 is a sectional view of a portion of the device taken as indicated by line 9—9 in Fig. 7.
Figure 10:
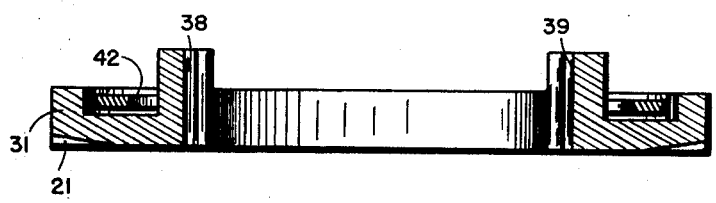
Fig. 10 is a sectional view of a portion of the device taken as indicated by line 10—10 in Fig. 8.
Figure 11:
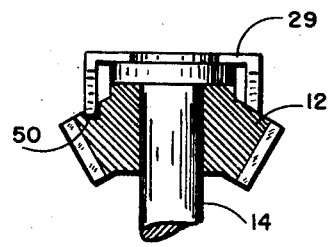
Fig. 11 is a sectional view taken as indicated by line 11—11 of Fig. 6.

Fig. 7 illustrates another embodiment of braking device in which outer ratchet wheel 30 (whose teeth are on the reverse face) has slots 32 and 33 and two elongated spring members 34 and 35. Spring action is obtained across narrow portions 36 and 37. Inner ratchet wheel 31, further illustrated in Fig. 8, lies beneath and within the reverse side of outer ratchet wheel 30 and has two bearing recesses 38 and 39 in which are located bearing pins 40 and 41. The bearing pins rotated clockwise do not bear against spring members 34 and 35. Rotated counter clockwise (by the outer ratchet wheel 30 and inner ratchet wheel 31 being out of alignment) the bearing pins lock spring members 34 and 35 against sleeve 26. Spring 42, connected by pin 43 to outer ratchet 30, holds the teeth of ratchet wheels 30 and 31 normally out of alignment and bearing pins in bearing position against the spring members which lock against sleeve 26. A conventional snap ring 44 locks the assembly of inner and outer ratchet wheels 30 and 31 together.

Referring again to Fig. 1, assuming that the load is providing a forward torque, that is, in the direction the ratchet wheel is attempting to drive, upon engagement of the pawl the load will be allowed to move forward, but only for the discrete distance commanded by each individual electrical impulse. The moment the impulses cease and the pawl no longer engages the ratchet wheel, the shaft again becomes locked relative to the case of the device.

Figure 6:
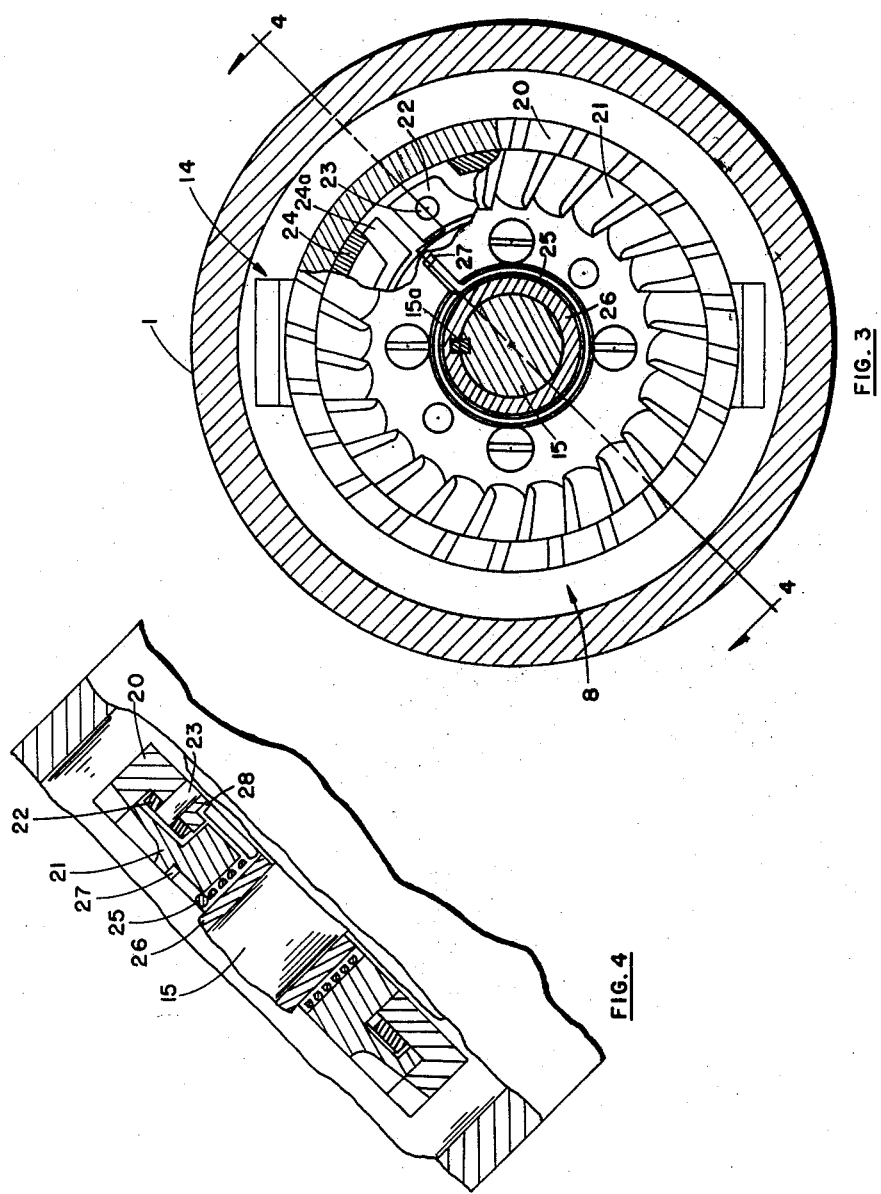
Fig. 6 is a top view of the spider gear taken on line 6—6, of Fig. 1 to show an alternative embodiment of the ratchet means.

A further feature may be incorporated as shown in Fig. 6. Spider gear 12 is a ratchet gear and is allowed to rotate on spider 14 in one direction only. Pawl 29, fixed to spider 14, cooperates with teeth such as 50 and 51 to limit rotation to one direction only. This allows only unidirectional rotation of each input gear of the differential. This prevents the motor mechanism from slipping backwards when acting against torques greater than the slippage value of the brake and less than the motor torque.

Therefore, the device is particularly suitable for dynamic loads having forward torque or back torque. It is also particularly adapted to control the release of torque or provide for the controlled slippage of a load. It is further adapted to provide effective braking according to received signal impulses. By reason of the differential, stepping or slipping can be obtained in either direction. As a step motor, it provides features and advantages not heretofore provided by prior devices.

A further feature of the device may be recognized if the ratchet on the spider gear is not used and solenoid 2 is designed to rotate ratchet wheel 8 in the same direction as ratchet wheel 9. The input gears to the differential would then be operating in the same direction. Such a device is useful as a step motor for receiving unsynchronized input signals and providing the summed output.

Although the invention has been described and illustrated in detail, it is to be clearly understood that the same is by way of illustration and example only, and is not to be taken by way of limitation, the spirit and scope of this invention being limited only by the terms of the appended claims.

I claim:

1. In a step motor, solenoid means, armature means actuated by said solenoid means, at least two ratchet means connected to be driven by said armature means, a differential gear comprising a first and second input gear and an output gear, each of said ratchet means connected to control a respective input gear.

2. The combination recited in claim 1 wherein is included braking means connected to said ratchet means, said braking means actuated by the motion of said armature.

3. In a step motor, solenoid means providing rotation in opposing directions, armature means actuated by said solenoid means, a first and second ratchet means connected to be driven in opposing directions by said armature means, and a differential gear comprising a first and second input gear and an output gear, said ratchet means connected to control a respective input gear.

4. In a step motor, a pair of solenoids, a respective armature associated with each said solenoid and actuated thereby, a respective ratchet means connected to be driven by each such armature, and a differential gear comprising a first and second input gear and an output gear, each said ratchet means connected to control a respective input gear.

5. In a step motor, a pair of solenoids, a respective armature associated with each said solenoid and actuated thereby, a respective ratchet means connected to be driven by each said armature, and a differential gear comprising a first and second input gear, an output gear, and a spider connected to said output gear, each said ratchet means connected to control a respective input gear, an output shaft connected to said spider.

6. The combination recited in claim 5 wherein said output gear is restricted to rotation in one direction only and said input gears are rotated in opposite directions by their respective ratchet means.

7. In a step motor, a solenoid, an armature actuated by said solenoid, ratchet means associated with said armature so as to be actuated thereby, said ratchet means comprising pawl means and a ratchet wheel, means for locking said ratchet wheel against rotation, means actuable by the engagement of said pawl with the teeth of said ratchet wheel to unlock said ratchet wheel as said pawl means moves into engagement with said ratchet wheel.

8. In a step motor, a solenoid, an armature actuated by said solenoid, ratchet means associated with said armature so as to be actuated thereby, said ratchet means comprising pawl means, a first ratchet wheel, a second ratchet wheel coaxially mounted with said first ratchet wheel, spring means between said ratchet wheels maintaining the teeth of said wheels normally out of alignment, braking means for said ratchet wheels, said braking means activated by the misalignment of said ratchet wheels and deactivated by the alignment of said ratchet wheels.

9. In a step motor, a solenoid, an armature actuated by said solenoid, ratchet means associated with said armature so as to be actuated thereby, said ratchet means comprising pawl means, a first ratchet wheel and a second ratchet wheel coaxially mounted with said first ratchet wheel, a gear connected to be driven by one of said ratchet wheels, spring means between said ratchet wheels maintaining the teeth of said ratchet wheels normally out of alignment, braking means connected to one of said ratchet wheels, said braking means actuated by the relative rotation of said ratchet wheels.

10. In a step motor, a pair of solenoids, a respective armature associated with each said solenoid and actuated thereby, respective ratchet means associated with each said armature so as to be actuated thereby, each said ratchet means comprising pawl means, a first ratchet wheel, a second ratchet wheel coaxially mounted with said first ratchet wheel, spring means between said ratchet wheels maintaining the teeth of said ratchet wheels normally out of alignment, a differential gear comprising two input gears and an output gear, each of said ratchet means connected to control a respective input gear, braking means for each said ratchet means, said braking means actuated by the relative rotation of said ratchet wheels.

11. The combination recited in claim 6 wherein said braking means comprises a fixed member, and spring means disposed between said ratchet means and said fixed member, said spring means brought into binding engagement between said ratchet means and said fixed member upon relative rotation of said first and second ratchet wheels.

12. The combination recited in claim 6 wherein said braking means comprises a fixed member and a coil spring surrounding said member, said coil spring tightened against said fixed member by the misalignment of the teeth of said first and second ratchet wheels and loosened by the alignment of the teeth of said first and second ratchet wheels.

13. A ratchet gear comprising a first ratchet wheel and a second ratchet wheel coaxially mounted, pawl means adapted to engage the teeth of said ratchet wheels, spring means connected from one ratchet wheel to the other maintaining the teeth of said wheels normally out of alignment, a fixed axial member extending through said ratchet wheels, a coil spring encircling said fixed axial member and anchored at one end in one of said ratchet wheels and, at the other end, in the other of said ratchet wheels, said coil spring operated to grip said fixed member upon the misalignment of said first and second ratchet wheels and release said fixed member upon the alignment of said ratchet wheels, whereby said ratchet wheels are locked in misalignment and unlocked in alignment.

References Cited in the file of this patent

UNITED STATES PATENTS

| | | |
|---|---|---|
| Re. 22,779 | Swift | Aug. 13, 1946 |
| 688,656 | Lester | Dec. 10, 1901 |
| 2,150,019 | Baule | Mar. 7, 1939 |
| 2,201,798 | Scott et al. | May 21, 1940 |
| 2,341,989 | Horstmann | Feb. 15, 1944 |